R. M. TEMPLE.
MIXER.
APPLICATION FILED FEB. 27, 1912.
1,036,374.
Patented Aug. 20, 1912.
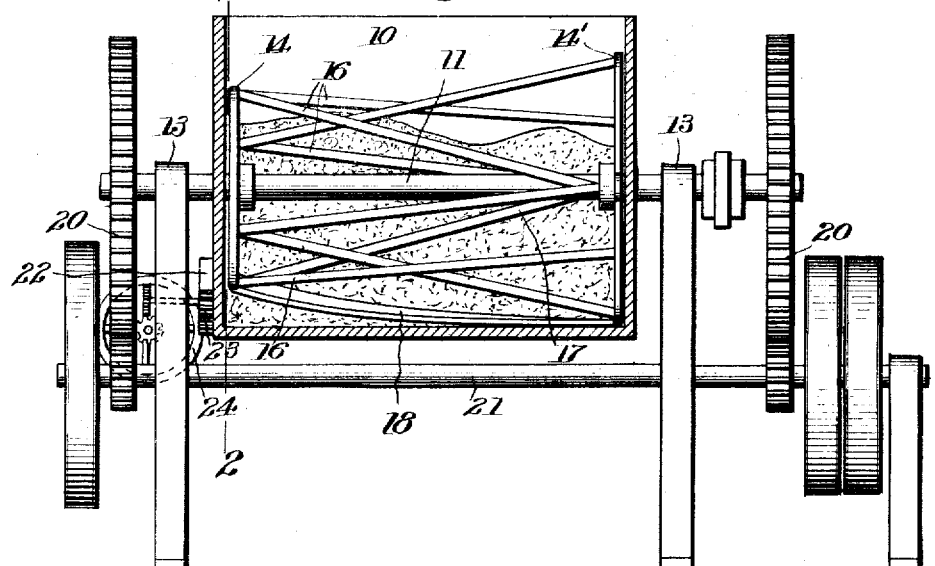
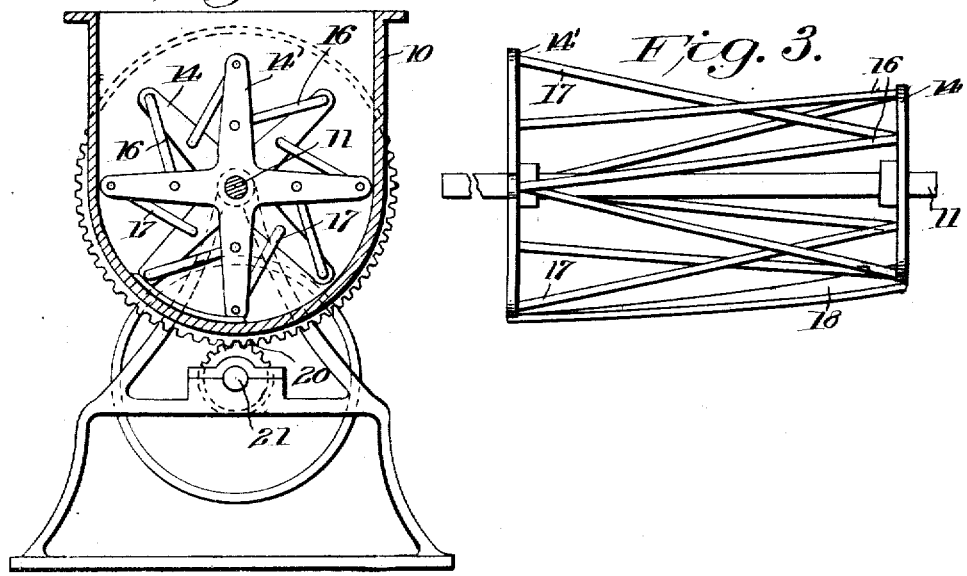
WITNESSES
INVENTOR
Robert M. Temple
By Hodges & Hodges
Attorneys

UNITED STATES PATENT OFFICE.

ROBERT M. TEMPLE, OF PHILADELPHIA, PENNSYLVANIA.

MIXER.

1,036,374.  Specification of Letters Patent.  Patented Aug. 20, 1912.

Application filed February 27, 1912. Serial No. 680,237.

*To all whom it may concern:*

Be it known that I, ROBERT M. TEMPLE, a citizen of the United States, residing at Philadelphia, in the county of Philadelphia and State of Pennsylvania, have invented new and useful Improvements in Mixers, of which the following is a specification:

This invention contemplates certain new and useful improvements in mixers, and relates more particularly to that class of apparatus employed in mixing bread, cake, and similar doughs, icings, chocolate, printing ink, paints, and similar masses of a doughy or pasty nature.

The object of the invention is to produce an improved apparatus by means of which the contents of the mixer are subjected to a uniform, though violent agitation, by means of which the dry and liquid materials are first shaken into granular form and subsequently to a smooth and elastic consistency, after which the continued operation of the apparatus will so completely mix the ingredients within the mixer as to produce a most highly developed uniform mass.

The invention will be hereinafter fully set forth and particularly pointed out in the claims.

In the accompanying drawing:—Figure 1 is a longitudinal sectional view illustrating my improved mixer. Fig. 2 is a transverse sectional view on the line 2—2, Fig. 1. Fig. 3 is a side elevation of the beater.

Referring to the drawing, 10 designates a casing or receptacle constructed to receive the ingredients to be mixed, and 11 is a shaft extending longitudinally therethrough, said shaft being rotatably mounted in suitable bearings 13. Keyed or otherwise secured to the shaft 11 are end members or spiders 14, 14', the arms of said spiders being relatively staggered and connected by oppositely inclined diagonally disposed beater bars 16, 17. In this connection it will be noted that one end of each bar 16 is connected to one of the arms of the spider 14 and extends diagonally toward the shaft 11, being secured to the other spider 14', as shown. Likewise, the arms or bars 17 extend in like manner from the outer ends of the arms of spider 14' to the spider 14. Thus, viewing the beater from the front of the machine, the beater arms 16 are inclined downwardly to the right, and the beater arms 17 are inclined downwardly to the left. If desired a scraping knife 18 may be secured at its ends to one arm of each of the spiders 14, 14', although it is obvious that for some materials such a scraper will not be required.

The shaft 11 is rotated in any suitable manner, such for instance, through the medium of gears and pinions 20 actuated by a drive shaft 21, receiving power in any preferred manner. The receptacle 10 may be dumped by any suitable means, such as a segmental rack 22, meshing with a pinion 23, which may be rotated at will by means of a hand wheel 24.

In practice, the ingredients to be mixed are placed within the casing or receptacle 10, and the beater is rotated by means of the gearing 20. In their rotation the bars 16, 17, uniformly and violently agitate the said ingredients, first shaking the dry and liquid materials into granular form, and then by continued vibration during the rotation thereof, bringing the mass into a smooth and elastic consistency. As the rotation of the beater continues the mass is caused to lap over and under from end to end, and from the outside to the inside, so that while said mass is being spun it is also continually changing its position, finally resulting in the formation of a glutinous substance, highly developed and uniform in consistency.

Having thus explained the nature of my invention and described an operative manner of constructing and using the same, although without attempting to set forth all of the forms in which it may be made, or all of the forms of its use, what I claim is:—

1. An improvement in mixers comprising a beater provided with oppositely disposed end members, and staggered beater bars extending from each member to the other, the contiguous ends of alternate beater bars being located nearer the axis of the beater than the corresponding ends of the remaining beater bars.

2. An improvement in mixers comprising a beater provided with a shaft, end members carried by said shaft, and staggered beater rods extending from each member to the other member, the contiguous ends of alternate beater rods being located nearer to said shaft than the corresponding ends of the remaining beater bars.

3. An improvement in mixers comprising a beater provided with oppositely disposed spiders provided with relatively staggered radial arms, and beater arms connecting the arms of the oppositely disposed spiders, the contiguous ends of alternate beater bars being located nearer the outer ends of the radial arms than the corresponding ends of the remaining beater bars.

4. An improvement in mixers comprising a beater provided with oppositely disposed spiders having relatively staggered radial arms, and staggered beater bars each extending from the outer end of the alternate radial arms of each spider to the inner portions of the alternate radial arms of the other spider.

5. An improvement in mixers comprising a beater provided with end members, staggered beater bars connecting said end members, the contiguous ends of alternate beater bars being located nearer the axis of the beater than the corresponding ends of the remaining beater bars, and a scraping knife also secured to said end members.

6. An improvement in mixers comprising a beater provided with oppositely disposed spiders, said spiders being provided with relatively staggered radial arms, beater bars extending from the outer ends of the radial arms of each of said end members, and a scraping knife secured to one arm of each spider.

In testimony whereof I have hereunto set my hand in presence of two subscribing witnesses.

ROBERT M. TEMPLE.

Witnesses:
FRANCES M. STEWART,
A. J. H. FRANK.

---

Copies of this patent may be obtained for five cents each, by addressing the "Commissioner of Patents. Washington, D. C."